(12) United States Patent
Sakata (10) Patent No.: US 8,280,571 B2
(45) Date of Patent: Oct. 2, 2012

(54) DRIVE CONTROLLER FOR HYBRID VEHICLES

(75) Inventor: Kunio Sakata, Kawasaki (JP)

(73) Assignee: Mitsubishi Fuso Truck and Bus Corporation, Kanagawa (JP)

( * ) Notice: Subject to any disclaimer, the term of this patent is extended or adjusted under 35 U.S.C. 154(b) by 332 days.

(21) Appl. No.: 12/734,693

(22) PCT Filed: Nov. 26, 2008

(86) PCT No.: PCT/JP2008/071374
§ 371 (c)(1),
(2), (4) Date: May 18, 2010

(87) PCT Pub. No.: WO2009/069612
PCT Pub. Date: Jun. 4, 2009

(65) Prior Publication Data
US 2010/0256850 A1 Oct. 7, 2010

(30) Foreign Application Priority Data
Nov. 26, 2007 (JP) .................................. 2007-304728

(51) Int. Cl.
*B60L 11/00* (2006.01)
(52) U.S. Cl. .................. 701/22; 903/946; 180/65.28
(58) Field of Classification Search .............. 701/22, 701/51, 53, 54, 66, 67, 68; 180/65.25, 65.26, 180/65.28; 903/946
See application file for complete search history.

(56) References Cited

U.S. PATENT DOCUMENTS

| 4,361,060 | A | * | 11/1982 | Smyth | 477/78 |
|---|---|---|---|---|---|
| 5,293,316 | A | * | 3/1994 | Slicker | 701/68 |
| 5,327,992 | A | * | 7/1994 | Boll | 180/65.25 |
| 5,343,970 | A | * | 9/1994 | Severinsky | 180/65.25 |
| 5,439,428 | A | * | 8/1995 | Slicker | 477/175 |
| 5,979,257 | A | * | 11/1999 | Lawrie | 74/335 |
| 6,054,776 | A | * | 4/2000 | Sumi | 290/17 |
| 6,574,535 | B1 | * | 6/2003 | Morris et al. | 701/22 |
| 6,602,161 | B2 | * | 8/2003 | Hemmingsen et al. | 477/79 |
| 6,823,954 | B2 | * | 11/2004 | Shimabukuro et al. | 180/65.25 |
| 6,901,751 | B2 | * | 6/2005 | Bunting et al. | 60/297 |
| 2002/0038174 | A1 | * | 3/2002 | Koumura et al. | 701/51 |
| 2002/0170758 | A1 | * | 11/2002 | Shimabukuro et al. | 180/65.2 |
| 2003/0045988 | A1 | * | 3/2003 | Suzuki et al. | 701/54 |
| 2003/0145582 | A1 | * | 8/2003 | Bunting et al. | 60/297 |
| 2004/0123589 | A1 | | 7/2004 | Ohtake et al. | |
| 2005/0023055 | A1 | * | 2/2005 | Imazu et al. | 180/65.2 |
| 2006/0042587 | A1 | * | 3/2006 | Ellinger et al. | 123/305 |
| 2006/0218903 | A1 | * | 10/2006 | Ogata | 60/295 |
| 2007/0246272 | A1 | * | 10/2007 | Ogata | 180/65.2 |

FOREIGN PATENT DOCUMENTS

JP 10 68335 A 3/1998
(Continued)

*Primary Examiner* — Ruth Ilan
*Assistant Examiner* — Barry Gooden, Jr.
(74) *Attorney, Agent, or Firm* — Jacobson Holman PLLC (57) ABSTRACT

A drive controller for hybrid vehicles, the hybrid vehicle comprising: an engine; a motor which is able to assist the driving force from the engine; an automatic clutch mechanism which is able to engage/disengage the transmission of the driving force between the engine and the motor; an automatic transmission disposed downstream of the motor; a filter for collecting particulates in exhaust gas; and a controller for controlling operations of these devices, wherein the controller operates in such a way that, for regenerating the filter, the idling speed while the vehicle is halted is set higher, and the predetermined rotational speed for initiating the clutch engagement is set higher than the rotational speed at the time of non-regeneration of the filter in light of increase in the engine rotational speed for the fast-idle control.

10 Claims, 5 Drawing Sheets

FOREIGN PATENT DOCUMENTS

| | | |
|---|---|---|
| JP | 2002 285823 A | 10/2002 |
| JP | 2004-204774 | 7/2004 |
| JP | 2005-113709 | 4/2005 |
| JP | 2005 214061 A | 8/2005 |
| JP | 2006 275009 A | 10/2006 |
| JP | 2006 275010 A | 10/2006 |

* cited by examiner

DRIVE CONTROLLER FOR HYBRID VEHICLES

This is a national stage of PCT/JP08/071374 filed Nov. 26, 2008 and published in Japanese, which has a priority of Japanese no. 2007-304728 filed Nov. 26, 2007, hereby incorporated by reference.

TECHNICAL FIELD

The present invention relates to a drive controller for hybrid vehicles comprising a filter for collecting particulates.

BACKGROUND ART

Figure 4:
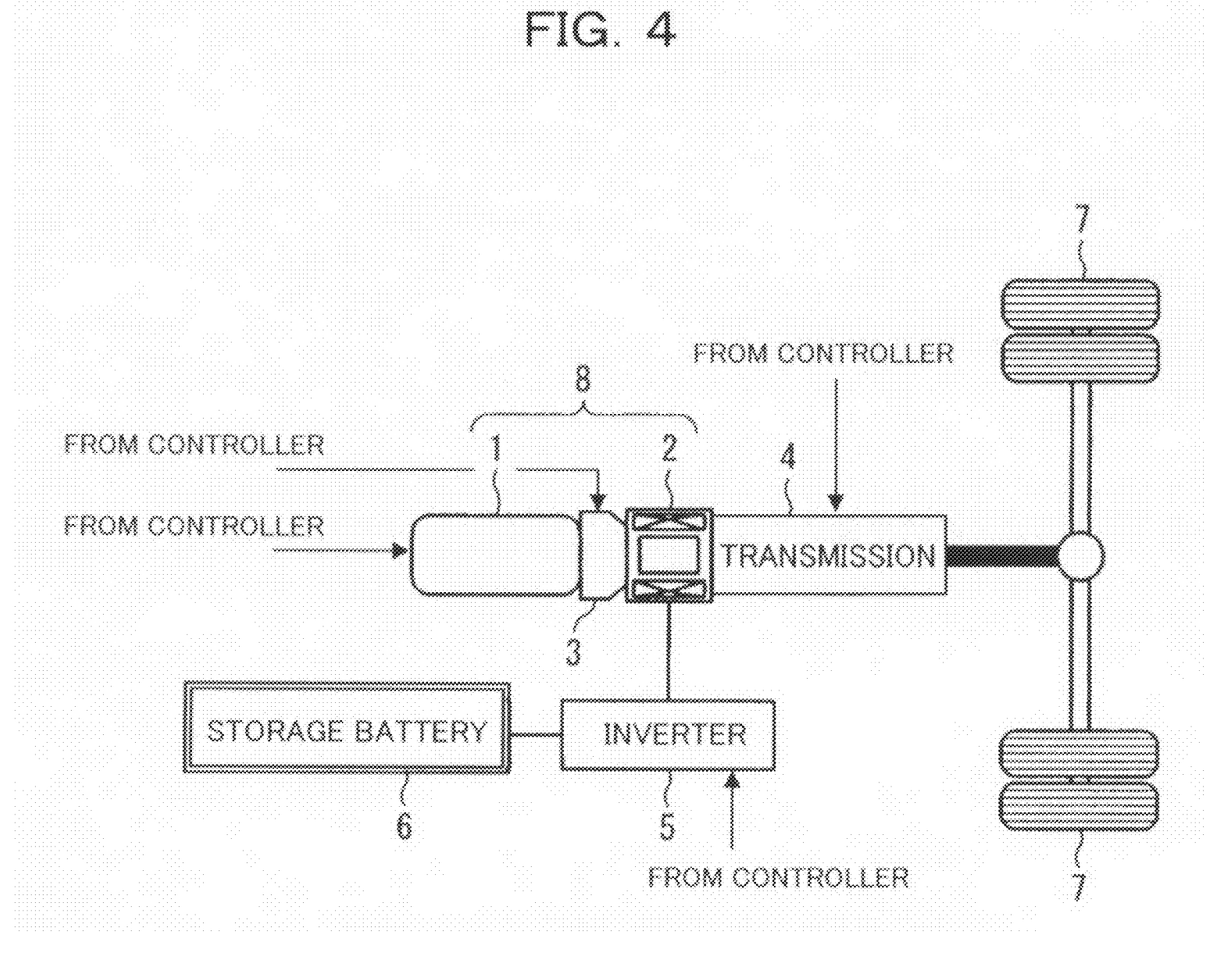
FIG. 4 is a figure giving an explanation on a previously known technique.

FIG. 4 is a schematic diagram illustrating an example of a power train of a hybrid vehicle. As shown in the figure, this vehicle comprises an engine 1 and an electric motor (or motor generator, hereinafter simply referred to as motor) 2 as drive sources 8 and a clutch (automatic clutch mechanism) 3 between the engine 1 and the motor 2, which is able to engage/disengage the transmission of driving force from the engine 1 toward the motor 2. In the output of the motor 2, a transmission 4 is connected that varies the output rotational speed from the engine 1 and/or motor 2. Namely, in this vehicle, the engine 1, clutch 3, motor 2 and transmission 4 are in this order connected in series and the driving force that is output from the transmission 4 is transmitted to driving wheels 7.

To the motor 2, a battery 6 which can be charged and discharged is connected via an inverter 5. The operational state of the motor 2 can be controlled by controlling the operation of the inverter 5.

Therefore, the vehicle can run by the assistance of driving force from the motor 2 in addition to the driving force from the engine 1 when the motor 2 is driven and the clutch 3 is engaged.

When the motor 2 functions as a generator, the battery 6 can be charged with the electricity produced by the driving force from the engine 1, and also the electric power can be regenerated by a brake, namely a regenerative brake, to the driving wheels 7. On the other hand, the driving wheels 7 can be driven only by the driving force from the motor 2 with the clutch 3 disengaged, namely, power running can be performed, by supplying power from the battery 6 to the motor 2.

The transmission 4 is a noncontinuously-variable automatic transmission, which shifts the present gear to the target one which is specified by a shift map which is not shown in the drawings. For example, it is constructed in such a way that a plurality of actuators, not shown in the drawings, are added to a parallel and biaxial gear type manual transmission. By operating the actuators, gears can be shifted.

The clutch 3 is an automatic clutch mechanism by which the clutch is automatically engaged/disengaged at the time of shifting gears and the like. The engagement/disengagement of the clutch 3 is carried out by a clutch actuator which is not shown in the drawings.

The engine 1 is a diesel engine that uses light oil as a fuel. Controlling operating time (namely, amount of fuel injection) of an injector (not shown in the drawings) of the engine 1 can control output torque of the engine 1.

The above-described vehicle shown in FIG. 4 can start off just with the motor 2.

In such a case, the vehicle starts off just by driving force from the motor 2 with the clutch 3 disengaged, and when the rotational speed of the clutch reaches a predetermined rotational speed (for example 750 rpm), an engine rotational speed synchronization control is carried out for synchronizing the engine rotational speed to the clutch rotational speed. Then, if the difference between the engine rotational speed and the target engine rotational speed, which is calculated on the basis of the engine rotational speed and the clutch rotational speed, is equal to or smaller than a predetermined synchronization-judgement threshold (for example, ±100 rpm), the clutch 3 is made engaged.

Subsequently, the vehicle runs by driving forces from both the engine 1 and motor 2. As a document showing cooperative control between an engine 1 and a motor 2 at the time of starting off of a vehicle can be cited Patent Document 1.

[Patent Document 1] Japanese Patent Laid-Open Publication No. Hei 10-68335

DISCLOSURE OF THE INVENTION

Problem to Be Solved by the Invention

Incidentally, in vehicles with a diesel engine, a particulate filter (hereinafter simply referred to as a filter) is generally provided in its exhaust pipe. The filter collects particulate matter (PM) contained in the exhaust gas and is regenerated by burning PM that accumulated on the filter.

As such a regeneration method is known a technique that NO contained in the exhaust gas is oxidized with the aid of oxidation catalyst disposed upstream of the filter to produce $NO_2$, which is then reacted with PM in the filter to burn (oxidize) the PM. In a regeneration process, the amount of fuel injection is controlled so that the filter temperature will be suitable for regeneration. For example, fuel is injected during exhaust strokes for filter regeneration.

In such a filter regeneration process for ordinary vehicles which travel just by engine driving force, a fast-idle control, by which the idling rotation speed of the engine is set higher for heating the exhaust gas, is carried out when the vehicle is stopped even if its automatic transmission 4 is located in D (Drive). At this point, in such vehicles as described earlier having a mechanical automatic transmission 4 constructed on the basis of a manual transmission, a fast-idle control does not transmit driving force from the engine 1 to the transmission 4 even when the shifter is in D because the clutch 3 is disengaged.

Such a fast-idle control can be carried out mainly by controlling the amount of fuel injection and thus controlling the engine rotational speed. For example, the engine rotational speed during fast idling is set at 850 rpm, in contrast to an ordinary engine rotational speed of 650 rpm.

When the vehicle starts off, such a fast-idle control for filter regeneration is completed and an ordinary engine control begins to be performed. The reason why a fast-idle control is stopped when the vehicle is running is to improve fuel economy and inhibit decrease in speed reduction when releasing the accelerator.

Whether a vehicle is running or not is judged on the basis of information from the vehicle speed sensor. When the detected vehicle speed is equal to or higher than a predetermined threshold value (for example, 4 km/h), the vehicle is judged to be running. At this point, the above threshold value was decided in consideration of the accuracy of the vehicle speed sensor and the like. In other words, the lowest speed that can be detected securely by the vehicle speed sensor was selected as the threshold value.

However, when adopting these mechanisms for fast-idle control during filter regeneration directly as a starting-off control of such general hybrid vehicles as shown in FIG. 4, the following problems will arise.

Figure 5:
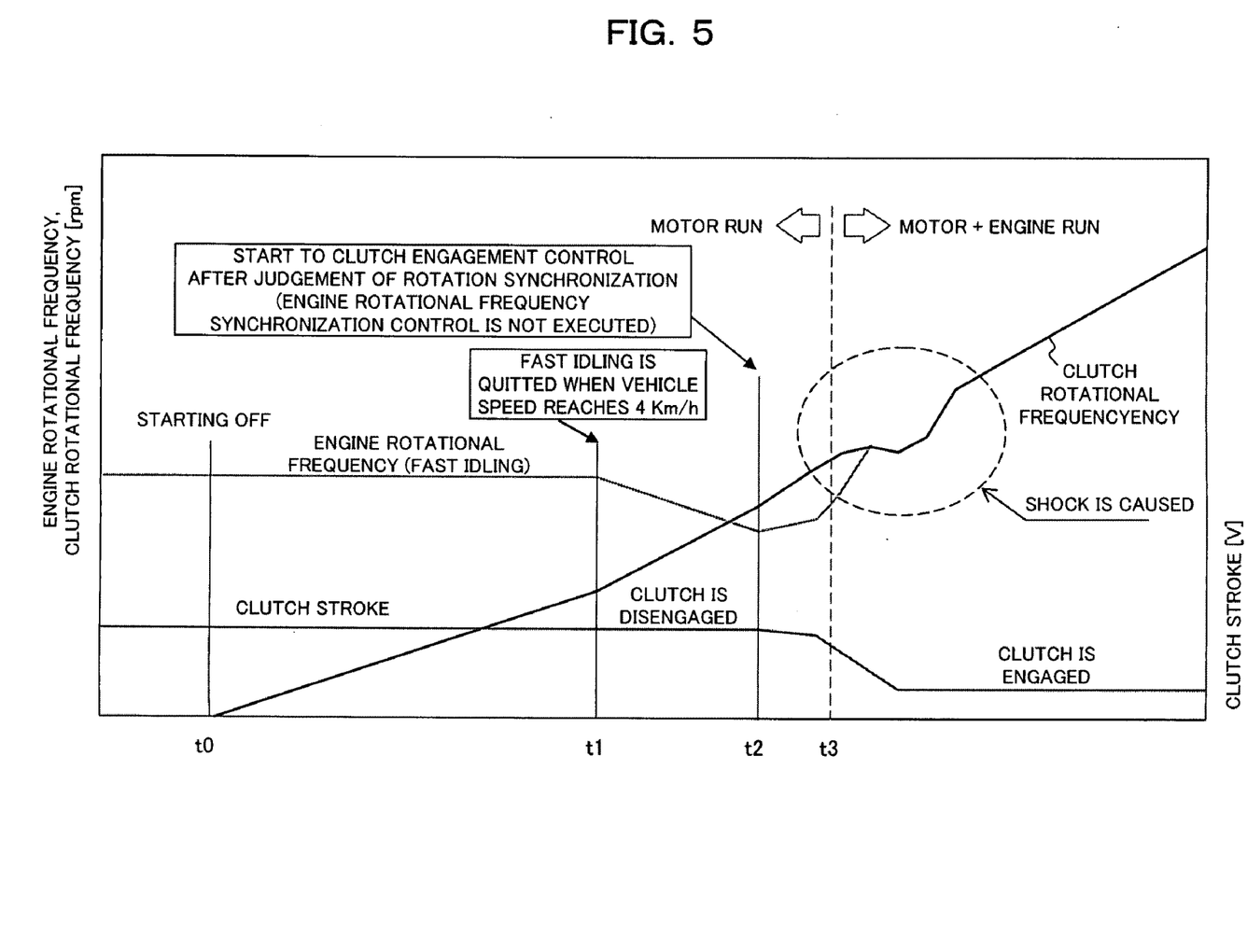
FIG. 5 is a figure giving an explanation on a previously known technique.

FIG. 5 is a graph illustrating an operation of a starting-off control at the time of a fast-idle control for filter regeneration which is applied to a hybrid vehicle shown in FIG. 4. The left ordinate shows engine rotational speed and clutch rotational speed. The right ordinate shows clutch stroke. In this graph, the clutch stroke is not shown by actual stroke length [mm] but by indicator voltage [V] to the clutch actuator because clutch stroke and indicator voltage to the clutch actuator are equivalent. The abscissa shows time t.

Assume that the vehicle is stopped with its shifter positioned in D, its clutch disengaged, and its filter being regenerated (namely, fast-idle control is being carried out).

In such a state, for example when the driver presses down on the accelerator at $t=t_0$, the vehicle begins to run only by the driving force from the motor 2. Then, the clutch rotational speed starts to increases as shown in the figure. Vehicle speed can be calculated from its clutch rotational speed, gear ratio of the transmission, final reduction ratio and radius of a moving tire. The clutch rotational speed is proportional to the vehicle speed. Therefore, clutch rotational speed is equivalent to vehicle speed.

As shown in the figure, when the vehicle speed increases and reaches a predetermined speed (4 km/h here) ($t=t_1$), the fast-idle control ends (or is discontinued) and thus the engine rotational speed begins to decrease.

When the clutch rotational speed reaches a predetermined rotational speed (for example, 750 rpm) ($t=t_2$), a rotational speed synchronization control of the engine 1 is carried out. Then, the difference between the engine rotational speed and the target engine rotational speed is decided, and when the difference becomes equal to or smaller than a predetermined synchronization-judgement threshold (±100 rpm), a judgement of synchronization is made, which triggers a start of engagement of the clutch 3 ($t=t_3$).

However, if the above difference of the rotational speeds is within the synchronization-judgement threshold at the time of $t_2$ when the clutch rotational speed reaches the predetermined rotational speed (750 rpm), the controller, not shown in the figure, judges that the engine rotational speed has been already synchronized with the clutch rotational speed and the clutch starts to be engaged without performing an engine rotational speed synchronization control.

At such a moment, the clutch rotational speed is increasing with increasing vehicle speed while the engine rotational speed is decreasing toward the idling rotational speed, and therefore, the difference between the two rotational speeds are increasing with time.

In addition, because there is a time lag from the synchronization judgement ($t_2$) to the clutch engagement ($t_3$), the engine rotational speed will fall significantly below the clutch rotational speed at the time of clutch engagement ($t=t_3$). In summary, in this state the difference between the two rotational speeds is significantly large and besides increasing. This leads to an abrupt change of the vehicle speed (namely, a shock) at the time of engagement of the clutch 3, which makes occupants of the vehicle suffer discomfort or other strange feelings.

When the filter is not regenerated (or in hybrid vehicles without filters), though not shown in the figure, the idling rotational speed of the engine 1 is set lower (650 rpm). Therefore, the difference between the engine rotational speed and the target engine rotational speed, which is decided on the basis of the clutch rotational speed, usually exceeds the synchronization-judgement threshold (100 rpm), which leads to an execution of the engine rotational speed synchronization control. For an engine rotational speed synchronization control, amount of fuel injection is increased in order to rise the engine rotational speed.

Then, when the difference between the engine rotational speed and the target engine rotational speed falls within the synchronization-judgement threshold, the clutch starts to be engaged. In this case, both the engine rotational speed and the clutch rotational speed are usually increasing and the difference between the two rotational speeds is usually small, and besides decreasing. This prevents the aforementioned shock.

The present invention has been made to solve the above problem. It aims at providing a drive controller of hybrid vehicles which starts off only by driving force from a motor which can decrease shock at the time of clutch engagement during a fast-idle control for filter regeneration.

Means for Solving the Problem

Namely, the subject matter of the present invention lies in a drive controller for hybrid vehicles, the hybrid vehicle comprising: a diesel engine mounted on a vehicle; a motor generator connected in series with said diesel engine which is able to assist the driving force of said diesel engine; an automatic clutch mechanism connected between said diesel engine and said motor generator which is able to engage/disengage the transmission of the driving force between said diesel engine and said motor generator; an automatic transmission that varies the rotation speed of said motor generator or said diesel engine; a filter for collecting particulates in exhaust gas from said diesel engine; and a controller for controlling operations of said diesel engine, said motor generator, said automatic clutch mechanism and said automatic transmission, wherein said controller operates in such a way that, for starting off of the vehicle, the vehicle is made to start off only by the driving force from said motor generator with said automatic clutch mechanism disengaged, and said automatic clutch mechanism is engaged after an engine rotational speed synchronization control is carried out, by which the engine rotational speed is controlled to be synchronized to a target engine rotational speed calculated on the basis of the clutch rotational speed, on the condition that the difference between the target engine rotational speed and the engine rotational speed is equal to or larger than a predetermined synchronization-judgement threshold when the clutch rotational speed reaches a predetermined rotational speed, and for regenerating said filter, a fast-idle control by which the idling speed of said diesel engine is kept higher than that at non-regeneration of said filter is carried out while the vehicle stops and quitted when the vehicle speed is detected, and the predetermined rotational speed is set at a rotational speed which is higher than that at non-regeneration of said filter. (claim 1).

Another subject matter of the present invention lies in a drive controller for hybrid vehicles comprising: a diesel engine mounted in a vehicle;

a motor generator provided in series with said diesel engine which is able to assist the driving force of said diesel engine; an automatic clutch mechanism provided between said diesel engine and said motor generator which is able to engage/disengage the transmission of driving force between said diesel engine and said motor generator; an automatic transmission that varies the rotation speed of said motor generator or said diesel engine; a filter for collecting particulates in exhaust gas from said diesel engine; and a controller for controlling operations of said diesel engine, said motor generator, said automatic clutch mechanism and said automatic transmission, wherein said controller operates in such a way that, for starting off of the vehicle, the vehicle is made to start off only by the driving force from said motor generator with said automatic clutch mechanism disengaged, and said automatic clutch mechanism is engaged after an engine rotational speed synchronization control is carried out, by which the engine rotational speed is controlled to be synchronized to a target engine rotational speed calculated on the basis of the clutch rotational speed, on the condition that the difference between the target engine rotational speed and the engine rotational speed is equal to or larger than a predetermined synchronization-judgement threshold when the clutch rotational speed reaches a predetermined rotational speed, and for regenerating said filter, a fast-idle control by which the idling speed of said diesel engine is kept higher than that at non-regeneration of said filter is carried out while the vehicle stops and the fast-idle control is maintained even after the vehicle speed is detected (claim 2).

In these cases, it is preferable that the predetermined rotational frequency for the filter regeneration for judging the engagement of a clutch of the automatic clutch mechanism is set equally to or higher than the engine rotational speed during the fast-idle control (claim 3).

Further, it is preferable that said controller ends the fast-idle control when said automatic clutch mechanism starts to be engaged after the vehicle started off (claim 4).

Further, it is preferable that said controller controls the clutch stroke speed during engagement of said automatic clutch mechanism so that the clutch stroke speed becomes lower when regenerating said filter than when not regenerating said filter (claim 5).

Further, it is preferable that the synchronization-judgement threshold is set smaller when regenerating said filter than when not regenerating said filter (claim 6).

Advantageous Effect of the Invention

In the drive controller for hybrid vehicles of the present invention, when regenerating the filter, the predetermined rotational speed for initiating the synchronization judgement of the clutch mechanism at the time of starting off of the vehicle is set higher than that of when not regenerating the filter, and therefore, the clutch rotational speed gets higher at the beginning of the synchronization judgement when regenerating the filter. In the result, the difference between the clutch rotational speed and the engine rotational speed gets larger, which facilitates execution of an engine rotational speed synchronization control. In this way, the shock caused at the time of clutch engagement during a fast-idle control for filter regeneration can be reduced (claim 1).

Furthermore, in the drive controller for hybrid vehicles of the present invention, during filter regeneration, a fast-idle control is not only executed while the vehicle is stopped but also it is maintained even after the speed of the vehicle is detected. This makes it possible to keep the engine rotational speed high, in contrast to decrease in it of previous drive controllers for hybrid vehicles. Therefore, a state where the engine rotational speed is decreasing and the clutch rotational speed is increasing at the time of clutch-engagement judgement, namely, a state in which the difference of the two rotational speeds are significantly increasing can be inhibited. In the result, a significantly increased difference of the two rotational speeds can be circumvented even with a certain length of time lag from the synchronization judgement to the actual engagement of the clutch, which can reduce the shock caused at the time of clutch engagement during a fast-idle control for filter regeneration (claim 2).

Furthermore, because the predetermined rotational speed, which is used for judgements of clutch mechanism engagement when regenerating the filter, is set higher than the fast-idle rotational speed, the clutch rotational speed surely gets higher than the engine rotational speed at the time of clutch-engagement judgements. Therefore, when the engine rotational speed synchronization control is executed, the engine rotational speed and the clutch rotational speed are both increasing because the clutch rotational speed is usually increasing at the time of starting of the vehicle. This makes it possible to reduce the shock at the time of clutch engagement (claim 3).

Furthermore, the fast-idle control is set to be ended when the clutch engagement is started by the automatic clutch mechanism after the vehicle started off, which makes it possible to quit unnecessary fast-idle control immediately and thus to prevent the fuel economy from becoming worse (claim 4).

Furthermore, the clutch stroke speed is lowered when regenerating the filter compared to when not regenerating the filter, which can reduce the shock further at the time of clutch engagement (claim 5).

Furthermore, the synchronization-judgement threshold is set smaller when regenerating the filter than when not regenerating said filter, which reduces the tendency of cancellation of the engine rotational speed synchronization control. This makes it possible to reduce the shock further at the time of clutch engagement (claim 6).

EXPLANATION OF LETTERS OR NUMERALS

1: engine (diesel engine)
2: motor (motor generator)
3: clutch (automatic clutch mechanism)
4: transmission (automatic transmission))
5: inverter
9: controller
13: engine rotational speed sensor
14: clutch rotational speed sensor

BEST MODES FOR CARRYING OUT THE INVENTION

Figure 1:
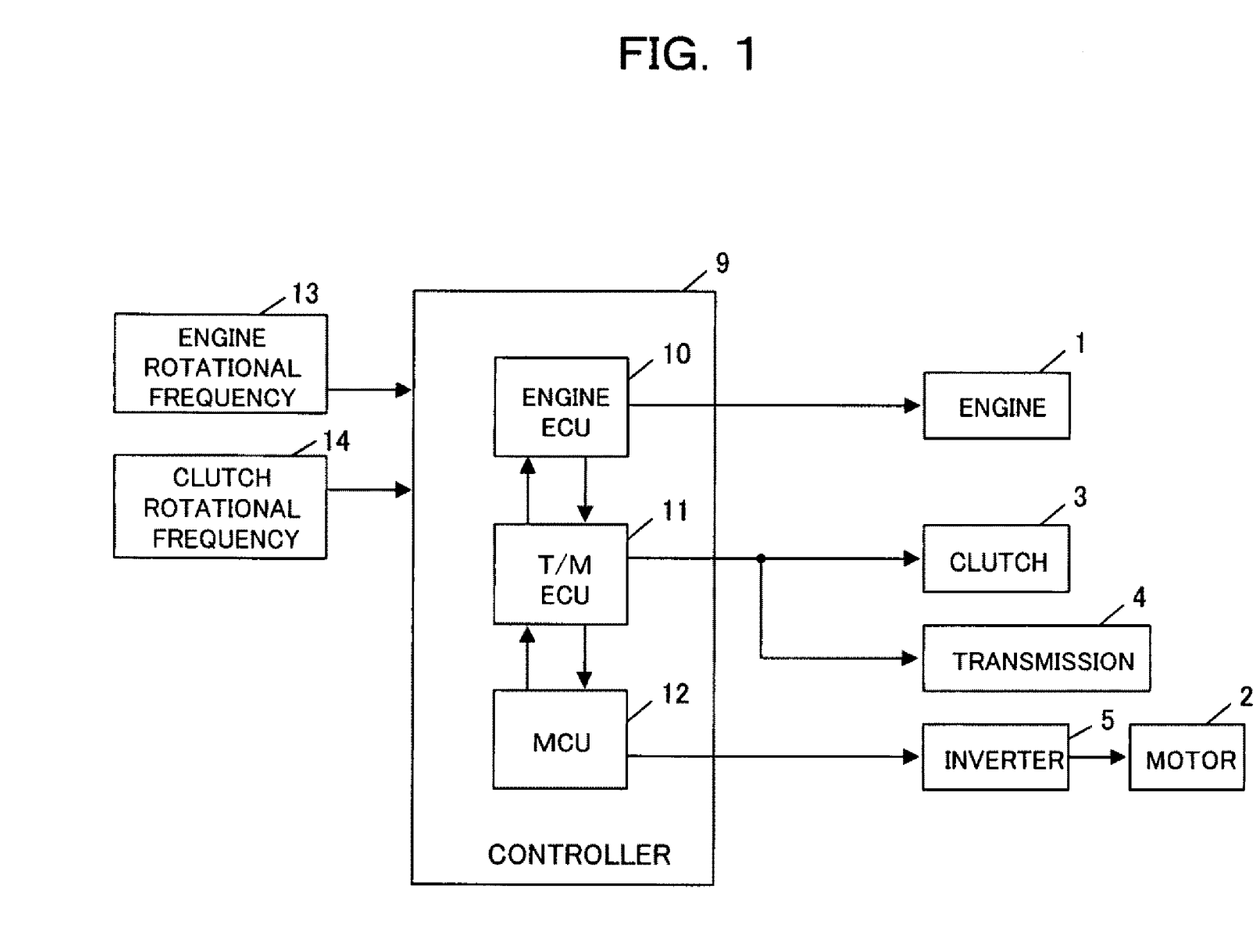
FIG. 1 is a schematic block diagram showing the essential part of the structure of the drive controller for hybrid vehicles according to one embodiment of the present invention.
Figure 2:
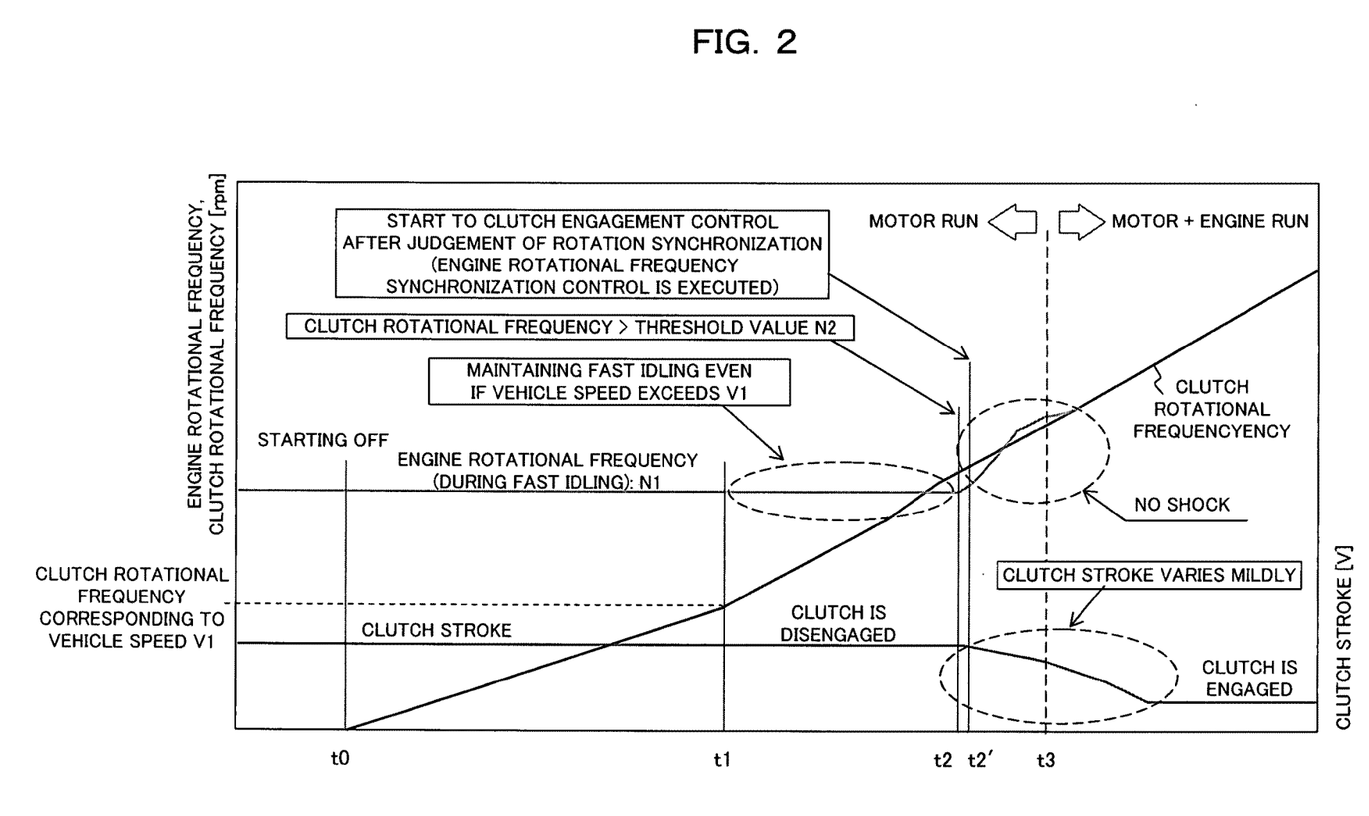
FIG. 2 is a graph illustrating the operation characteristics of the drive controller for hybrid vehicles according to one embodiment of the present invention.
Figure 3:
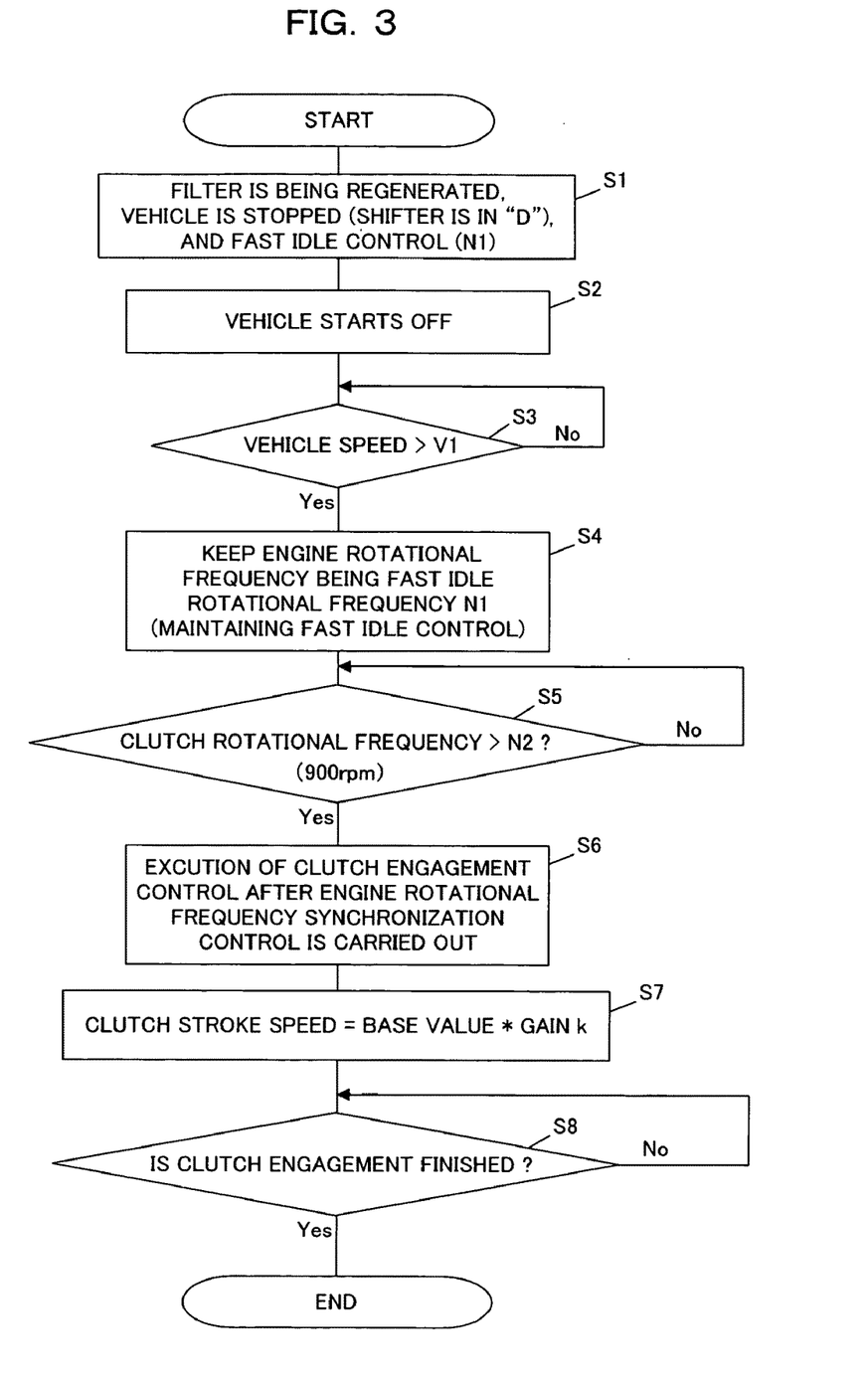
FIG. 3 is a flowchart illustrating the operation of the drive controller for hybrid vehicles according to one embodiment of the present invention.

In the following, explanation will be given on a drive controller for hybrid vehicles according to one embodiment of the present invention, with reference to the drawings. FIG. 1 is a schematic block diagram showing the essential part of the structure thereof. FIG. 2 is a graph illustrating the operation characteristics thereof. FIG. 3 is a flowchart illustrating the operation thereof.

Hardware of the hybrid vehicle to which the present invention is applied is constructed in the same way as that described for FIG. 4. In what follows, components of the hybrid vehicle will be explained briefly with reference to FIG. 4. The vehicle is a parallel hybrid electric vehicle (HEV) comprising an engine 1 and an electric motor (or motor generator, hereinafter simply referred to as motor) 2 as drive sources 8 It also comprises a clutch (automatic clutch mechanism) 3, between the engine 1 and the motor 2, which is able to engage/disengage the transmission of driving force from the engine 1 toward the motor 2.

In the output of the motor 2, a transmission 4 is connected that varies the output rotational speed from the engine 1 and/or motor 2. The transmission 4 is constructed as a mechanical automatic transmission, which is an automated manual transmission of parallel and biaxial gear type.

To the motor 2, a battery 6 which can be charged and discharged is connected via an inverter 5. The operational state of the motor 2 can be controlled by controlling the operation of the inverter 5.

The clutch 3 is an automatic clutch by which the clutch is automatically engaged/disengaged at the time of shifting gears and the like. The engagement/disengagement of the clutch 3 is carried out by a clutch actuator which is not shown in the drawings.

In the present embodiment, the clutch 3 is basically disengaged when the vehicle stops, the vehicle runs only by the driving force of the motor 2 at the time of starting off thereof, and the vehicle runs by the driving forces of the engine 1 and the motor 2 with the clutch 3 engaged when predetermined conditions are fulfilled such as a clutch rotational speed that reached a predetermined rotational speed.

The engine 1 is, in the present embodiment, a diesel engine using light oil (HC) as fuel. In the exhaust pipe of the engine 1, a diesel particulate filter (hereinafter simply referred to as filter), not shown in the drawings, is disposed. The filter is made of a porous material as a whole. It comprises alternately adjoining first paths and second paths. The first path opens upstream and closes downstream. The second path closes upstream and opens downstream. With this structure, exhaust gas flowing into the filter enters the second path from the first path through the porous wall, and at that time, particles of the PM (particulate matter, which mainly consists of carbon) contained in the exhaust gas are collected by the wall.

When the pressure difference between the upstream part and the down stream part of the filter exceeds a predetermined value, the filter is judged to be clogged and a filter regeneration control is executed. Incidentally, the filter regeneration control can be carried out by a variety of known techniques. The detail of such a regeneration control is not described here.

As shown in FIG. 1, this vehicle comprises a controller 9 that controls operation of the engine 1, motor 2, clutch 3 and transmission 4. The controller 9 has an engine ECU (Electric Control Unit) 10 that controls the engine 1, a transmission ECU 11 that controls operations of the clutch 3 and the transmission 4, and an MCU (motor control unit) 12 that controls operation of the motor 2 by using the inverter 5. These controllers 10 to 12 are collectively referred to as "controller" in this context.

Each controller 10 to 12 comprises an input-output device, memory (ROM, RAM, nonvolatile RAM, or the like), computing unit (CPU), timer/counter, and the like. In addition, to each controller 10 to 12, an engine rotational speed sensor 13 that detects the rotational speed Ne of the engine 1 and a clutch rotational speed sensor 14 that detects the output rotational speed (namely, the rotational speed of the input shaft of the transmission 4) Nt of the clutch 3 are connected. Since the clutch rotational speed, which is detected by the clutch rotational speed sensor 14, is equivalent to the vehicle speed, the clutch rotational speed sensor 14 may function also as a vehicle speed sensor. However, in the present embodiment, a vehicle speed sensor (not shown in the figure) is provided separately.

Furthermore, each controller 10 to 12 can communicate mutually through a communication line complying with CAN (Controller Area Network) or other standards. For example, the transmission ECU 11 sends an indication of fuel injection amount to the engine ECU 10, and feedback on actual injection amount is sent from the engine ECU 10 to the transmission ECU 11.

Next, explanation will be given on the substantial part of the present invention. The present embodiment is characterized by the clutch control during filter regeneration which is carried out after starting off of the vehicle only by the driving force from the motor. That will be explained with reference to FIG. 2. The left ordinate of the figure shows engine rotational speed Ne and clutch rotational speed Nt. The right ordinate shows clutch stroke. In this graph, the clutch stroke is not shown by actual stroke length [mm] but by indicator voltage [V] to the clutch actuator because clutch stroke and indicator voltage to the clutch actuator are equivalent. The abscissa shows time t.

During filter regeneration, when a halt of the vehicle is detected on the basis of the information from the vehicle speed sensor, a fast-idle control is executed in which the idling rotational speed of the engine 1 is set higher than normal times (times without filter regeneration). In the present embodiment, the idling rotational speed $N_{id}$ at normal times (times without filter regeneration) is around 600 to 700 rpm (for example, 650 rpm), and the idling rotation speed N1 at the time of a fast-idle control is around 800 to 900 rpm (for example, 850 rpm).

The fast-idle control is executed for temperature rising of the filter, as is the case with previous ones. At that time, the vehicle is halted with the shifter in D and the clutch, as shown in FIG. 2, disengaged.

Starting off operations ($t=t_0$) by the driver such as depressing the accelerator in the above state triggers driving of the motor 2 to make the vehicle start off with the clutch being disengaged, and the vehicle speed gets increased. Then, when a clutch rotational speed corresponding to a vehicle speed V1 (for example, 4 to 5 km/h) is attained at $t=t_1$, a request for maintaining the fast-idle control is sent to the engine ECU 10 from the transmission ECU 11 in the present invention, relative to the previous techniques, in which the fast-idle control has been ended. This makes the fast-idle control execution continued.

Therefore, the engine rotational speed is maintained at N1 even after the vehicle speed exceeds V1.

Subsequently, when the clutch rotational speed increases and reaches a predetermined rotational speed N2 (for example, 900 rpm) ($t=t_2$), an engine rotational speed synchronization control of the engine 1 is executed. The engine rotational speed synchronization control is carried out in such a manner that the engine 1 increases the fuel injection amount on the basis of indication from the engine ECU 10. The fuel injection amount was indicated from the transmission ECU 11 to the engine ECU 10.

The predetermined rotational speed is set higher at N2 at the time of filter regeneration than N3, which is the predetermined rotational speed at normal times (times without filter regeneration), (namely N3<N2, N3 is for example 750 rpm) in light of increase in the engine rotational speed caused by a fast-idle control.

Specifically, the predetermined rotational speed N2 at the time of filter regeneration is set at a rotational speed that is equal to the engine rotational speed N1 at the time of a fast-idle control added with the absolute value of synchronization-judgement threshold a (for example, 50 rpm) to be described later. It is preferable that the predetermined rotational speed is set at not less than (N+|α|), where N1 is the engine rotational speed during a fast-idle control and α is the synchronization-judgement threshold.

Then, whether the difference ΔN between the target engine rotational speed Nt', which is calculated from the clutch rotational speed Nt, and the engine rotational speed Ne is smaller than the predetermined synchronization-judgement threshold is judged by the transmission ECU 11 on the basis of information from the engine rotational speed sensor 13 and the clutch rotational speed sensor 14. In the present embodiment, the target engine rotational speed Nt' is calculated by adding a predetermined rotational speed (for example, 60 rpm) to the clutch rotational speed Nt.

Furthermore, the synchronization-judgement threshold during filter regeneration is set smaller than the synchronization-judgement threshold at normal times (times without filter regeneration) for the purpose of inhibiting a shock caused at the time of clutch engagement. Namely, the synchronization-judgement threshold during filter regeneration is set at a smaller value (±50 rpm) than the synchronization-judgement threshold at normal times (±100 rpm).

The above rotational-speed difference ΔN between the target engine rotational speed and the actual engine rotational speed at the beginning of the engine rotational speed synchronization control is, in the present embodiment, close to the synchronization-judgement threshold of ±50 rpm, because the clutch rotational speed N2 is 900 rpm and the engine rotational speed N1 is 850 rpm at the time of start of the rotational speed synchronization control of the engine 1. However, the above rotational-speed difference ΔN gets bigger than the threshold value a because the clutch rotational speed usually increases even after the clutch rotational speed Nt reaches N2 due to the acceleration of the vehicle. This leads to an execution of the rotational speed synchronization control.

Subsequently, when the engine rotational speed Ne is increased by the engine rotational speed synchronization control and the difference between the target engine rotational speed Nt' and the engine rotational speed Ne falls within the synchronization-judgement threshold, the actuator of the clutch 3 operates in accordance with the control signal from the transmission ECU 11 to execute an engagement of the clutch 3.

An engine rotational speed synchronization control is being carried out in this case and therefore the engine rotational speed is increasing. Accordingly, the engine rotational speed temporarily exceeds the clutch rotational speed (namely, Ne>Nt), as shown in FIG. 2, until the clutch engagement is completed. By executing a clutch engagement in such a state, a shock generation can be significantly suppressed.

Also in the present embodiment, the clutch stroke speed during filter regeneration is set lower than the clutch stroke speed at normal times (times without filter regeneration) in order to inhibit shock at the time of clutch engagement. For example, a gain against the clutch stroke speed at normal times is set at around 0.85. Incidentally, the fast-idle control is ended when the engagement of the clutch 3 is started.

In the drive controller for hybrid vehicles according to one embodiment of the present invention, of which structure is such as described above, the clutch engagement operation proceeds, for example, in accordance with the flowchart shown in FIG. 3.

First, in the step S1, conditions of filter regeneration, the vehicle being halted (with its shifter in D), and fast-idle control develop. Then they go to step S2, in which the motor 2 is driven to make the vehicle start off.

Next, in the step S3, whether the vehicle speed is equal to or higher than the predetermined vehicle speed V1 is judged. In this context, the predetermined vehicle speed is a rotational speed that can be surely detected by the vehicle speed sensor. When the accuracy of the vehicle speed sensor is sufficiently high, the above judgement in the step S3 may be translated into "whether the vehicle speed is detected".

After the predetermined vehicle speed V1 is detected, the operation goes to the step S4, in which the transmission ECU 11 sends a request for maintaining the fast-idle control to the engine ECU and thus the engine rotational speed is kept at an idling rotational speed for fast-idle control.

Next in the step S5, whether the clutch rotational speed reaches the predetermined rotational speed N2 is judged, and when it reaches the predetermined rotational speed N2, the operation goes to the step S6, in which an engine rotational speed synchronization control and a clutch engagement control are carried out.

At this point, the threshold value N2 of the clutch rotational speed for initiating the engine rotational speed synchronization control is decided, as described earlier, in light of increase in idling rotational speed caused by the fast-idle control, and therefore, when the clutch rotational speed reaches the above predetermined rotational speed, the clutch rotational speed is sure to exceed the engine rotational speed (namely, Nt>Ne).

In the step S6, when the difference ΔN between the target engine rotational speed Nt' and the engine rotational speed Ne is equal to or larger than the synchronization-judgement threshold, an engine rotational speed synchronization control is executed for bringing the engine rotational speed Ne close to the target engine rotational speed Nt'. In this case, the engine rotational speed synchronization control is executed in a state where the clutch rotational speed Nt>the engine rotational speed Ne, and therefore, the engine rotational speed Ne is controlled so that it increases to reach the target engine rotational speed Nt', which is calculated on the basis of the clutch rotational speed Nt.

After that, when the difference between the engine rotational speed Ne and the target engine rotational speed Nt' falls below the synchronization-judgement threshold ±α, the transmission ECU 11 sends an instruction signal to the clutch 3 for its engagement, which triggers the engagement of the clutch. When the clutch engagement operation is started, the engine rotational speed synchronization control ends and the engine is controlled in a normal way.

Then the operation goes to the step S7, in which the clutch stroke speed when the clutch is engaged is calculated by multiplying the clutch stroke speed at normal times (base value) by a predetermined gain k (k<1).

Then the clutch 3 is engaged by controlling the operation of the clutch actuator (not shown in the drawings) at the above clutch stroke speed.

Finally in the step S8, whether the clutch 3 engagement is completed or not is judged, and when the completion of the clutch 3 engagement is detected, the present procedures are ended. Incidentally, the completion of the clutch 3 engagement can be decided, for example, by the clutch stroke length or by a comparison between the engine rotational speed Ne and the clutch rotational speed Nt.

As described in detail above, in the drive controller for hybrid vehicles of the present invention, the predetermined rotational speed N2, which is used for judgement of whether the clutch 3 should be engaged or not at the time of starting off of the vehicle while the filter is regenerated, is set higher during the fast-idle control than at normal times (times without filter regeneration). Therefore, the engine rotational speed synchronization control is executed when the clutch rotational speed Nt gets higher than at normal times.

In the result, when executing the engine rotational speed synchronization control after the vehicle started off only by the motor 2, the engine rotational speed is made increased. That is, the clutch rotational speed and the engine rotational speed are both increasing at that time, which makes it possible to reduce the shock caused by the clutch engagement during filter regeneration. Particularly, by setting the above-mentioned predetermined rotational speed at a rotational speed that is equal to or larger than the engine rotational speed Ne during a fast-idle control added with the absolute value of the synchronization-judgement threshold, the difference ΔN between the target engine rotational speed Nt' and the engine rotational speed Ne readily exceeds the synchronization judgement threshold and therefore the engine rotational speed synchronization control can be readily executed during a clutch-engagement judgement.

Furthermore, the fast-idle control is maintained even after the vehicle speed is detected during filter regeneration, which can circumvent decrease in engine rotational speed such as caused in conventional techniques. This makes it possible to prevent a shock of the clutch engagement caused by a rapidly increased difference between the engine rotational speed and the clutch rotational speed during the clutch-engagement judgement.

Furthermore, the clutch 3 stroke speed at the time of starting off of the vehicle is lowered when regenerating the filter compared to when not regenerating the filter, which can reduce the shock further at the time of clutch engagement. Furthermore, the synchronization-judgement threshold is set smaller when regenerating the filter than when not regenerating the filter, which facilitates the engine rotational speed synchronization control. This makes it possible to reduce the shock at the time of clutch engagement more securely.

An embodiment of the present invention has been described above. However, the present invention is not limited to the above embodiment, but any modifications can be added thereto within the scope of the present invention.

For example, the engine rotational speed, clutch rotational speed, synchronization-judgement threshold and the like described for the above embodiment can be appropriately changed. Moreover, the vehicle is not limited to one having the above-mentioned structure, as far as driving modes can be at least switched between one only by the driving force from the motor and another by the driving forces from the engine and the motor that are connected via a clutch mechanism. Therefore, the present invention can be applied to vehicles in which the motor and the transmission is connected in reverse arrangement to FIG. 4 or in which another clutch mechanism is connected to the downstream of the transmission.

The invention claimed is:

1. A drive controller for hybrid vehicles, the hybrid vehicle comprising:
    a diesel engine mounted on a vehicle; a motor generator connected in series with said diesel engine which is able to assist a driving force of said diesel engine;
    an automatic clutch mechanism connected between said diesel engine and said motor generator which is able to engage/disengage a transmission of the driving force between said diesel engine and said motor generator;
    an automatic transmission that varies a rotation speed of said motor generator or said diesel engine;
    a filter for collecting particulates in exhaust gas from said diesel engine; and
    said drive controller for controlling operations of said diesel engine, said motor generator, said automatic clutch mechanism and said automatic transmission, wherein
    said drive controller operates in such a way that,
    for starting off of the vehicle,
    the vehicle is made to start off only by the driving force from said motor generator (2) with said automatic clutch mechanism (3) disengaged, and said automatic clutch mechanism is engaged after an engine rotational speed synchronization control is carried out, by which an engine rotational speed (Ne) is controlled to be synchronized to a target engine rotational speed (Nt') calculated on a basis of a clutch rotational speed (Nt), on a condition that a difference between the target engine rotational speed (Nt') and the engine rotational speed (Ne) is equal to or larger than a predetermined synchronization-judgement threshold when the clutch rotational speed (Nt) reaches a predetermined rotational speed (N3), and
    for regenerating said filter,
    a fast-idle control by which an idling speed of said diesel engine is kept higher than that at which non-regeneration of said filter is carried out while the vehicle stops and when a vehicle speed is detected, and the predetermined rotational speed (N3) is set at a rotational speed (N2) which is higher than that at non-regeneration of said filter.

2. The drive controller for hybrid vehicles, according to claim 1, wherein
    a predetermined rotational frequency (N2) for the filter regeneration is set equally to or higher than the engine rotational speed during the fast-idle control.

3. The drive controller for hybrid vehicles, according to of claim 1, wherein
    said drive controller ends the fast-idle control when said automatic clutch mechanism starts to be engaged after the vehicle is started off.

4. The drive controller for hybrid vehicles, according to claim 1, wherein
    said drive controller (9) controls a clutch stroke speed during engagement of said automatic clutch mechanism so that the clutch stroke speed becomes lower when regenerating said filter than when not regenerating said filter.

5. The drive controller for hybrid vehicles, according to claim 1, wherein
    the synchronization-judgement threshold is set smaller when regenerating said filter than when not regenerating said filter.

6. A drive controller for hybrid vehicles comprising:
    a diesel engine mounted in a vehicle;
    a motor generator provided in series with said diesel engine which is able to assist a driving force of said diesel engine;
    an automatic clutch mechanism provided between said diesel engine and said motor generator which is able to engage/disengage a transmission of driving force between said diesel engine and said motor generator;
    an automatic transmission that varies a rotation speed of said motor generator or said diesel engine;
    a filter for collecting particulates in exhaust gas from said diesel engine; and
    said drive controller for controlling operations of said diesel engine, said motor generator, said automatic clutch mechanism and said automatic transmission, wherein
    said drive controller operates in such a way that,
    for starting off of the vehicle,
    the vehicle is made to start off only by the driving force from said motor generator with said automatic clutch mechanism disengaged, and said automatic clutch mechanism is engaged after an engine rotational speed synchronization control is carried out, by which an engine rotational speed (Ne) is controlled to be synchronized to a target engine rotational speed (Nt') calculated on a basis of a clutch rotational speed (Nt), on a condition that a difference between the target engine rotational speed (Nt') and the engine rotational speed (Ne) is equal to or larger than a predetermined synchronization-judgement threshold when the clutch rotational speed (Nt) reaches a predetermined rotational speed (N3), and for regenerating said filter, a fast-idle control by which an idling speed of said diesel engine is kept higher than that at which non-regeneration of said filter is carried out while the vehicle stops and the fast-idle control is maintained even after a vehicle speed is detected.

7. The drive controller for hybrid vehicles, according to claim 6, wherein a predetermined rotational frequency (N2) for the filter regeneration is set equally to or higher than the engine rotational speed during the fast-idle control.

8. The drive controller for hybrid vehicles, according to claim 6, wherein said drive controller ends the fast-idle control when said automatic clutch mechanism starts to be engaged after the vehicle is started off.

9. The drive controller for hybrid vehicles, according to claim 6, wherein said drive controller (9) controls a clutch stroke speed during engagement of said automatic clutch mechanism so that the clutch stroke speed becomes lower when regenerating said filter than when not regenerating said filter.

10. The drive controller for hybrid vehicles, according to claim 6, wherein the synchronization-judgement threshold is set smaller when regenerating said filter than when not regenerating said filter.

* * * * *